US006624845B2

(12) United States Patent
Loyd et al.

(10) Patent No.: US 6,624,845 B2
(45) Date of Patent: Sep. 23, 2003

(54) APPARATUS WITHIN A STREET LAMP FOR REMOTE SURVEILLANCE HAVING DIRECTIONAL ANTENNA

(75) Inventors: Jaylon D. Loyd, Austin, TX (US); Dan H. Marshall, II, Austin, TX (US)

(73) Assignee: Detection Dynamics Inc., Austin, TX (US)

( * ) Notice: Subject to any disclaimer, the term of this patent is extended or adjusted under 35 U.S.C. 154(b) by 0 days.

(21) Appl. No.: 10/123,502

(22) Filed: Apr. 15, 2002

(65) Prior Publication Data
US 2002/0154218 A1 Oct. 24, 2002

Related U.S. Application Data

(63) Continuation of application No. 09/265,462, filed on Mar. 10, 1999, now Pat. No. 6,462,775, which is a continuation-in-part of application No. 08/752,566, filed on Nov. 21, 1996, now Pat. No. 5,886,738.

(51) Int. Cl.[7] .................................................. H04N 7/18
(52) U.S. Cl. ........................ 348/151; 348/142; 348/143
(58) Field of Search ................................ 348/142–156, 348/207–215

(56) References Cited

U.S. PATENT DOCUMENTS 6,259,475 B1 * 7/2001 Ramachandran et al. ... 348/148

* cited by examiner

Primary Examiner—Andy Rao
(74) Attorney, Agent, or Firm—James W. Huffman

(57) ABSTRACT

A covert surveillance system for viewing images from a remote location is provided. The surveillance system provides a mirror, lens and camera arrangement within a small enclosure that allows full 360 degree pan, tilt, zoom, focus and iris control from a remote location. The system receives control commands such as rotate left, zoom out and tilt down via a radio receiver, and controls the camera accordingly. Images viewed by the camera are transmitted to a remote receiver for display on a monitor, or for recording. Continuous camera rotation is achieved by use of a specialized conductive drum that provides continuous electrical contact between camera signals and camera control. In one embodiment, the surveillance system is mounted in place of a photo detector in a street lamp, making the camera virtually undetectable. In addition, a rotatable directional antenna is included in the surveillance system to allow surveillance at great distances from the system. The directional antenna is remotely rotated using the same radio receiver that is used for camera control.

7 Claims, 7 Drawing Sheets

FIG. 5

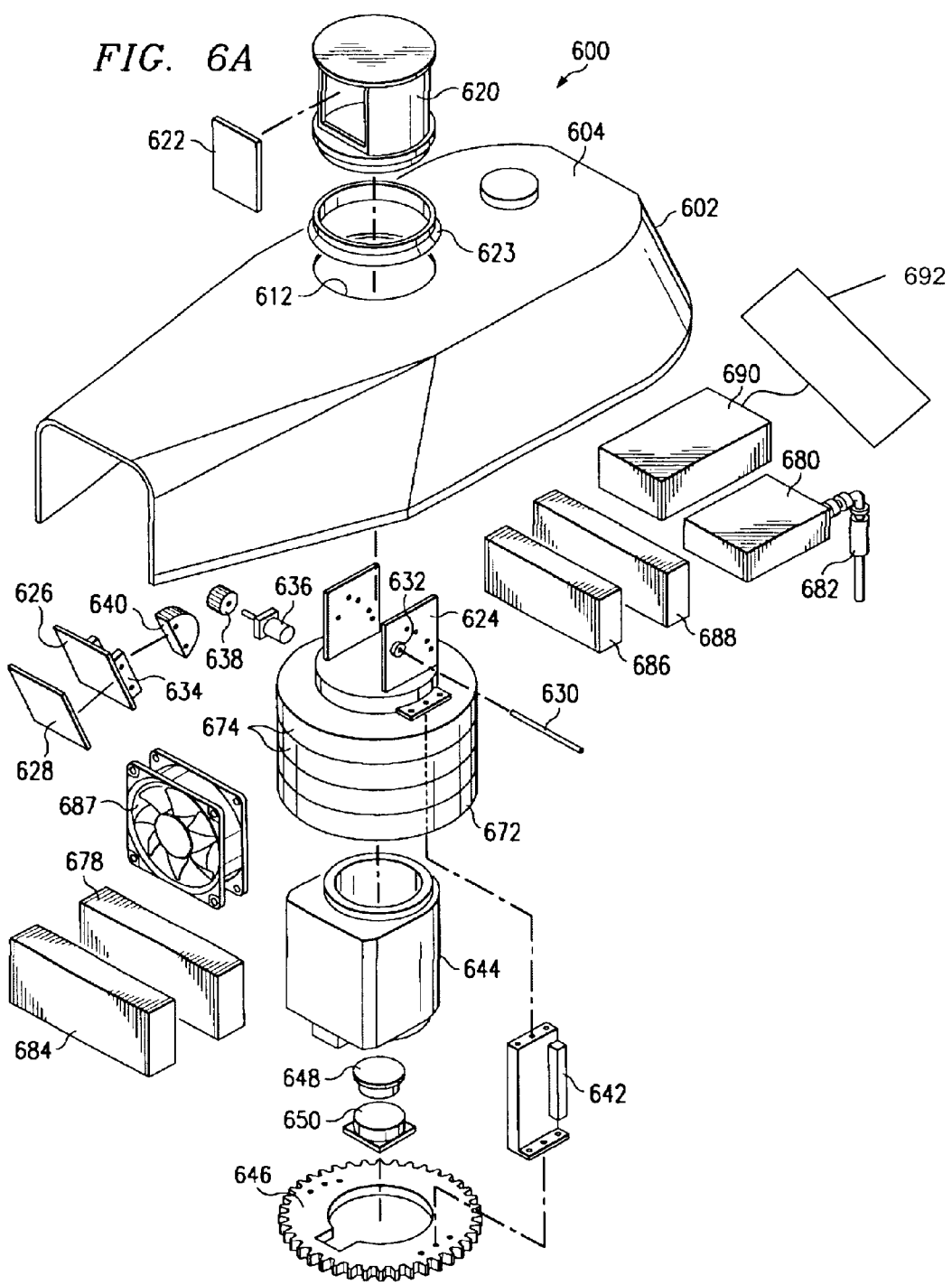

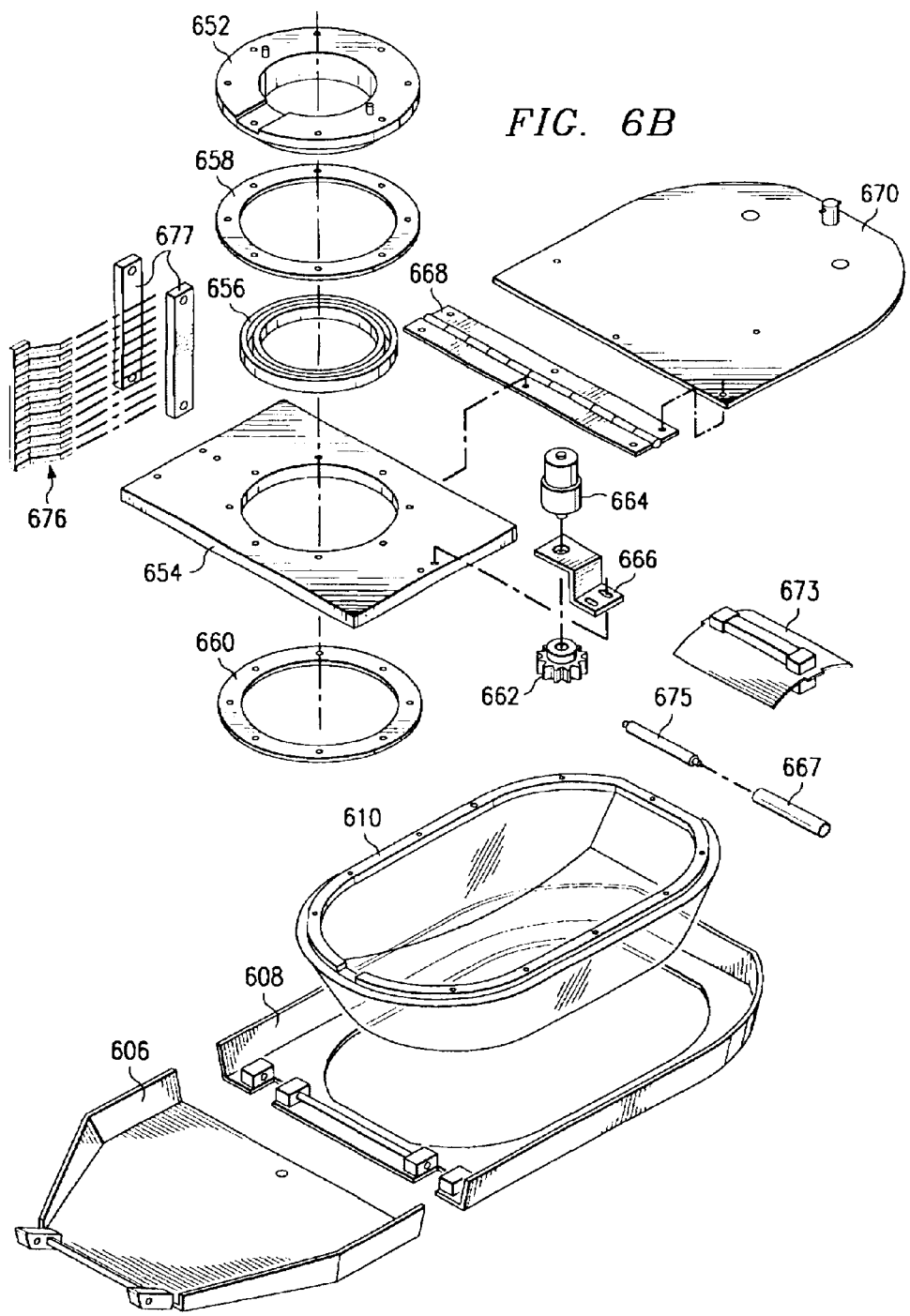

APPARATUS WITHIN A STREET LAMP FOR REMOTE SURVEILLANCE HAVING DIRECTIONAL ANTENNA

CROSS REFERENCE TO RELATED APPLICATIONS

This application is a continuation of U.S. patent application Ser. No. 09/265,462, filed Mar. 10, 1999, U.S. Pat. No. 6,462,775 which is a continuation-in-part of U.S. application Ser. No. 08/752,566 filed on Nov. 21, 1996 and now U.S. Pat. No. 5,886,738.

BACKGROUND OF THE INVENTION

1. Field of the Invention

This invention relates to visual surveillance systems, and more particularly to a covert surveillance system which provides remote control of sophisticated camera functions such as zoom, focus, pan, tilt, etc., within a street lamp, and also provides a remote controlled directional antennae.

2. Description of the Related Art

The purpose of a covert surveillance system is to monitor events from a remote or secret location. The equipment for this task ranges from simple television camera systems in banks or stores and metal-detecting devices at airports to airborne heat-sensing devices used by environmental officials to detect water polluters, and secret military satellites with a wide range of detection devices. The choice of surveillance system is dependent on the type of activity that must be monitored.

One of the most popular types of surveillance systems is the closed-circuit television. The closed-circuit television is used to watch banks, convenience stores, police stations, prisons, and other locations requiring constant security. Such systems have been installed in neighborhoods on an experimental basis to allow police departments to monitor high-crime-rate areas. Surveillance systems are in place in such diverse locations as the White House lawn, along portions of the U.S.-Mexican border, and in office buildings, amusement parks, and airports.

One of the problems in using closed-circuit televisions to monitor criminal activity is that the criminals are often aware that they are being watched. In locations such as banks, convenience stores, and prisons, notice of surveillance can often act as a deterrent to crime. However, if the purpose of the surveillance equipment is to capture criminal activity covertly (without tipping off the suspect), the camera for the surveillance system must be hidden.

Referring to FIG. 1, a prior art surveillance system 100 is shown which includes a camera 102 mounted to a motor 104 which rotates about a rod 106 suspended from a ceiling 108. The camera 102 is enclosed within an opaque globe 110 which hides the camera from view. The globe 110 has two lens portals 112 through which the camera 102 can view. In one embodiment, the camera 102 provides continuous video images to a remote monitor (not shown) via a coaxial cable. Other versions of the surveillance system 100 provide one way viewing globes 110 which allow the camera 102 to "see" through the globe at all rotations, while hiding the camera from external view.

While the surveillance system 100 "hides" the camera from external view, the presence of the surveillance system 100 is apparent. The globe 110 may be used to "hide" the momentary direction of the camera 102, or possibly to protect the camera from external vandalism, but its presence is not disguised. Thus, the surveillance system 100, while adequate to record activity within a particular location, is not useful for situations where the act of surveillance must be concealed.

A prior art surveillance system that is intended for covert monitoring is shown in FIG. 2. A periscope camera 200 is shown extending through a top surface 202 which is intended to be mounted on the roof of a vehicle, for example. The top of the camera 200 has a non-functional antenna 204 that is used to disguise the camera 200 as a cellular antenna, when the top of the camera 200 is flush with the surface 202. When in use, the camera 200 extends through the surface 202 and captures the desired images via a mirror 206. The captured images are transmitted to a lens and image capture device (not shown) within a box 208 which is mounted below the surface 202, and thus out of sight. The camera 200 is useful for instances where a van, or other type automobile, can be parked near the desired viewing area. However, when the vehicle itself would raise suspicion, the camera 200 does not provide an adequate solution.

Now referring to FIG. 3, an alternative prior art covert surveillance system 300 is shown. The surveillance system 300 includes a dummy electrical power line transformer 302 which is intended to be connected to a power line (not shown) on a power line pole. Within the transformer 302 is a surveillance camera 304 that views images through a window 306. The images are typically transmitted to a remote location for viewing and recording.

A problem associated with the surveillance system 300 is that it requires a power line technician to install it on a power line pole. This is often inconvenient, untimely, or expensive. In addition, the viewing window 306 is often observable by sophisticated suspects, thus defeating the covert purpose of the surveillance system. Furthermore, the viewing area of the camera 304 is restricted by the window 306, making the camera 304 useful in only one direction. And, the surveillance system 300 is useful only in those areas that have above ground power poles. In neighborhoods that have underground electric utilities, the surveillance system 300 is not applicable.

What is needed is a surveillance system which may be mounted in an undetectable location, which allows viewing in multiple directions, and which allows a user to remotely control sophisticated camera functions such as zoom, focus, aperture, pan and tilt. In addition, what is needed is a surveillance system that may be used in a variety of neighborhoods, parks, street corners, etc., without being noticed by sophisticated suspects.

Furthermore, what is needed is a surveillance system with a directional antenna that allows a remote user to monitor activity from remote locations, while obtaining optimum video signals from the surveillance camera.

In addition, what is needed is a surveillance system with a directional antenna, wherein the antenna can be remotely directed.

SUMMARY

To address the above-detailed deficiencies, it is an object of the present invention to provide a remote surveillance system within a street lamp, the surveillance system having a remotely controlled directional antenna.

Accordingly, in attainment of the aforementioned objects, it is a feature of the present invention to provide a remote surveillance system. The remote surveillance system includes camera image transmission logic, image reception logic, remote control logic, and a directional antenna system. The camera image transmission logic views images and transmits the viewed images. The image reception logic receives the transmitted images from the camera image transmission logic. The remote control logic selects images to be viewed by the camera image transmission logic. And, the directional antenna system, receives rotation commands from the remote control logic, and rotates a directional antenna in response to the rotation commands. The camera image transmission logic is substantially enclosed by a street lamp housing.

An advantage of the present invention is that surveillance images obtained by a surveillance camera may be viewed from great distances by including a directional antenna within the surveillance system.

Another advantage is that the remote location for viewing surveillance images may be changed, or moved, while still allowing optimum reception. This is provided for by changing the direction of the directional antenna using remote commands.

In another aspect, it is a feature of the present invention to provide a remote controlled directional antenna coupled to a surveillance camera system. The antenna includes direction command reception logic, to receive antenna direction commands from a remote location; a motor, coupled to the direction command reception logic, for turning in response to the antenna direction commands; and a directional antenna, coupled to the motor, to change direction in response to the turning of the motor. The commands that are transmitted from the remote location cause the directional antenna to be directed to the remote location for optimum reception of signals generated by the surveillance camera system.

BRIEF DESCRIPTION OF THE DRAWINGS

These and other objects, features, and advantages of the present invention will become better understood with regard to the following description, and accompanying drawings where:

FIG. 5 is a block diagram of a surveillance system according to the present invention, shown mounted within a street lamp.

FIGS. 6A and 6B provide an exploded view of the surveillance system according to the present invention mounted within a street lamp.

DETAILED DESCRIPTION

Figure 1:
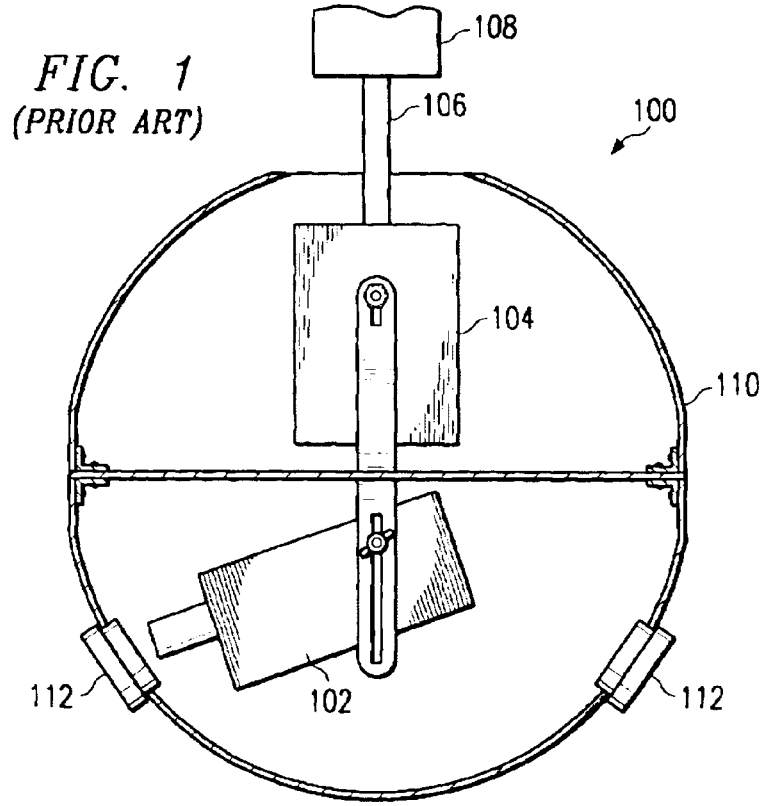
FIG. 1 is a cut away side perspective view of a prior art surveillance camera enclosed within a opaque globe.
Figure 2:
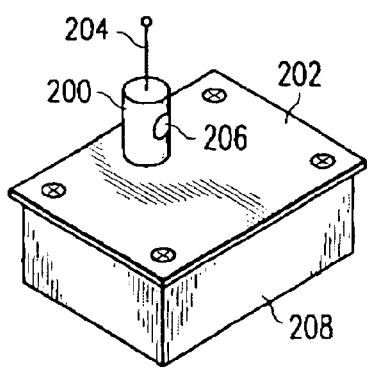
FIG. 2 is a top front perspective view of a prior art periscope surveillance camera for mounting within the roof or trunk of a sedan.
Figure 3:
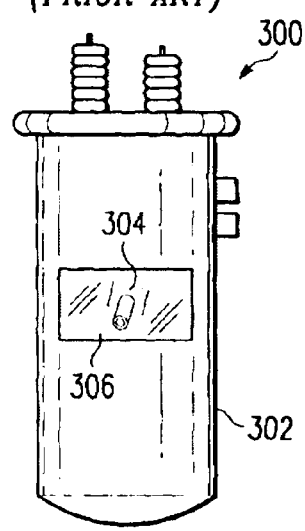
FIG. 3 is a front perspective view of a prior art surveillance camera disguised within an electric power line transformer.
Figure 4:
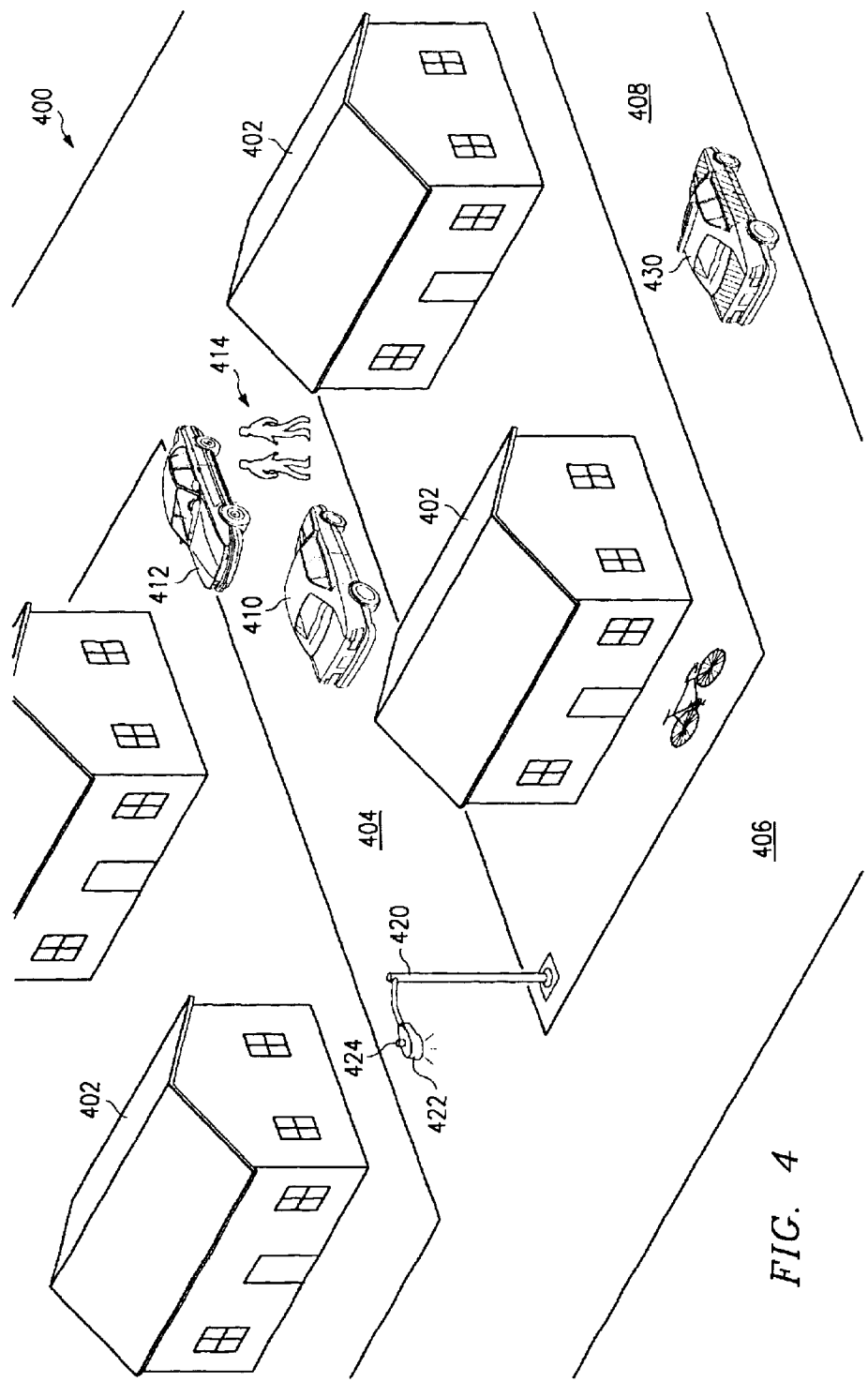
FIG. 4 is an aerial depiction of a surveillance system according to the present invention, mounted within a street lamp.

Referring to FIG. 4, an aerial view is provided of a neighborhood 400 where drug transactions and gang activity are suspected to occur. The neighborhood 400 has a number of houses 402, and a street 404 that intersects a street 406. The street 406 also has a side street 408 that runs parallel to street 404. For purposes of discussion, it is presumed that a vehicle on street 408 is hidden from view with respect to any location on street 404.

Also shown in the neighborhood 400 are two vehicles 410, 412. The drivers of vehicles 410, 412 are suspected to be drug traffickers 414, and are shown shaking hands on a particular transaction. Unknown to the traffickers 414, a surveillance system according to the present invention has been installed in a street lamp 420. More specifically, within a lamp housing 422, a remote controlled surveillance system has been installed which replaced the photo detector 424 on top of the street lamp 420. On street 408, a police car 430 is parked, out of view of street 404. An officer (not shown) within the police car 430 remotely operates the surveillance system within the street lamp 420 to direct a camera towards the traffickers 414, zoom in on their location, adjust for lighting conditions, if necessary, and record their transaction. After the transaction has been recorded, the information may be used by the officer as evidence against the traffickers 414.

The discussion above with respect to FIG. 4 is exemplary only. FIG. 4 is intended to provide a fact scenario to better appreciate the novelty and advantages of the present invention, as discussed below. Other applications of the surveillance system of the present invention will become apparent after review of the following.

Figure 5:
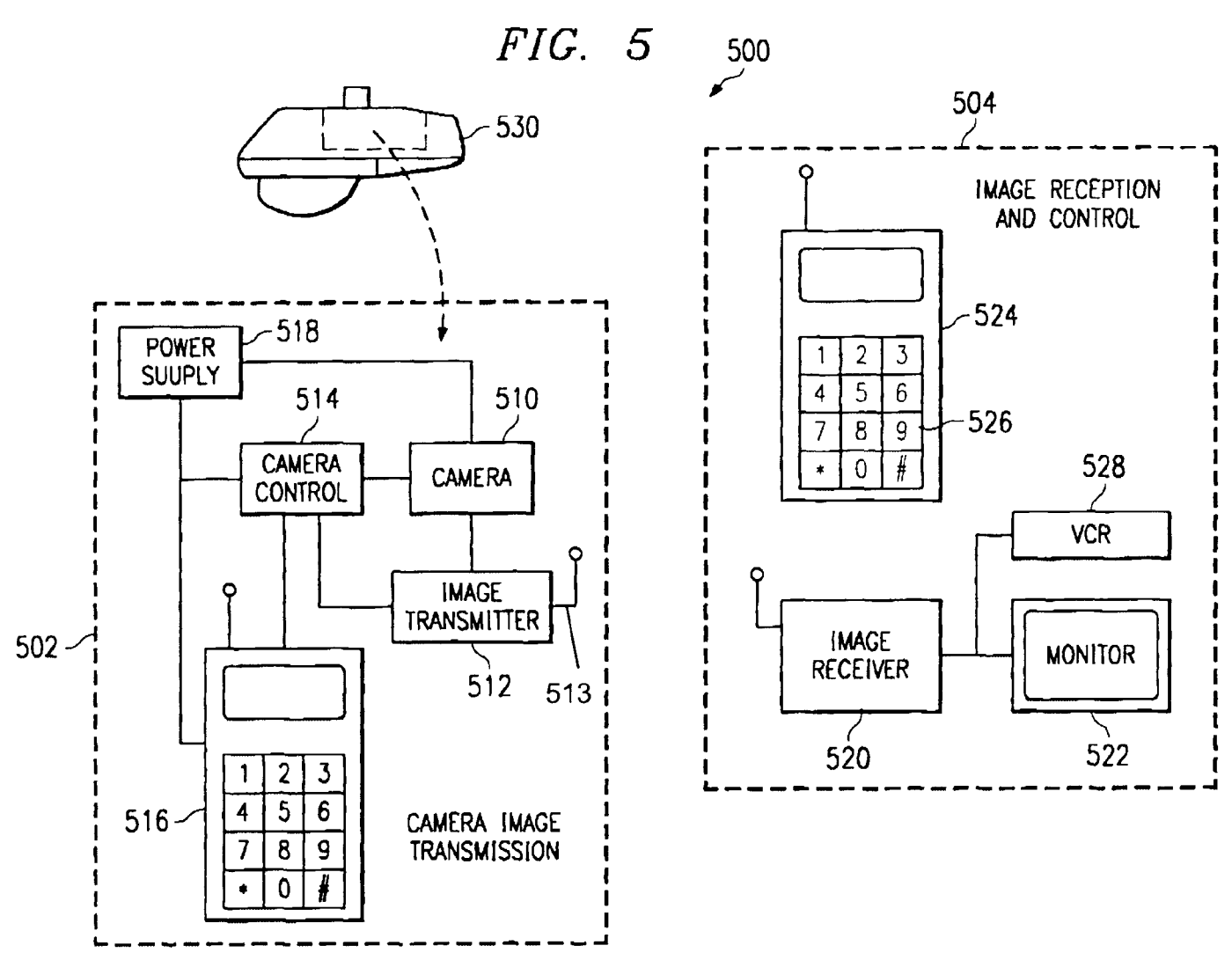

Referring now to FIG. 5 a block diagram of a surveillance system 500 is provided. The surveillance system 500 includes two logically separate functional blocks: a camera image transmission block 502 and an image reception and control block 504. The transmission block 502 includes a camera 510 for capturing images, an image transmitter 512, coupled to a directional antenna 513, for transmitting images to a remote receiver, camera control circuitry 514 for controlling the direction (i.e., pan and tilt), zoom, focus and aperture of the camera 510, and for controlling the direction of the antenna 513, and a radio receiver 516 connected to the camera control 514, for receiving remotely transmitted camera control information and for delivering the information to the camera control circuitry 514. In addition, the camera image transmission block 502 includes a power supply 518 that provides power to the other devices within the block 502. The camera image transmission block 502 is configured to be housed within a street lamp 530 as will be further discussed with reference to FIGS. 6A & 6B.

Within the image reception and control block 504 are an image receiver 520 connected to a monitor 522. The image receiver 520 receives images transmitted by the image transmitter 512, and provides these to the monitor 522 for viewing. Also connected to the image receiver 520 is a video cassette recorder (VCR) 528. The VCR 528 is used to record video images received by the image receiver 520. Also included in the control block 504 is a radio transmitter 524 that has a keypad 526.

Operation of the surveillance system 500 is provided as follows. When a user in a location which is remote from the street lamp 530 wishes to view images using the camera 510, s/he communicates with the camera image transmission block 502 via the radio transmitter 524. In one embodiment, the radio transmitter 524 is an off the shelf type walkie-talkie radio which can both send and receive information. In an alternative embodiment, a hand held commander (not shown) is coupled to the radio transmitter 524 to provide an different user interface for commanding the remote camera 510 and antenna 513. The commander includes a joy stick for camera up/down/right/left movement, far and near focus buttons, open and close iris control, and left and right rotation commands for turning the directional antenna 513. One skilled in the art will appreciate that a number of different wireless communication systems may have been used, either along, or in combination with a commander. But, the walkie-talkie radio was chosen because of its small size and its low cost.

In one embodiment, camera control functions have been mapped to the keys of the keypad 526 in the following arrangement:

| Function | Tone Command |
| --- | --- |
| Camera Left | 4 |
| Camera Right | 6 |
| Camera Up | 2 |
| Camera Down | 8 |
| Zoom In | 1 |
| Zoom Out | 7 |
| Focus Near | 3 |
| Focus Far | 9 |
| Iris Open | 0 |
| Iris Closed | 5 |
| Rotate Antenna Left | **1 |
| Rotate Antenna Right | **3 |
| Auto Iris | *2 (*A) |
| Manual Iris | *6 (*M) |
| Video Transmitter On | 8 (T) |
| Video Transmitter Off | 9 (X) |

Thus, when a user wishes to begin receiving video images, he/she presses the 8 keys on the keypad 526. This transmits a DTMF signal to the corresponding walkie-talkie radio 516 in the camera image transmission block 502. The radio 516 receives 8 command and delivers this command to the camera control block 514. The camera control 514 notifies the image transmitter 512 to begin transmitting images received from the camera 510. It should be readily understood that use of DTMF control signals are particularly applicable when using touch tone transmission for control. However, if the means of transmission were via a serial cable, for example, other control code formats would be applicable.

In one embodiment, the image transmitter 512 is a 2 watt microwave video transmitter which operates in a frequency range between 2450.0 and 2483.5 MHz. One skilled in the art should appreciate that the operational frequency range may be changed to correspond to particular governmental requirements. For example, the frequency range may be changed operate between 1.7 and 1.9 Ghz. In addition, the center frequency of the image transmitter 512 may be selectively tuned by the manufacturer as desired by the user. The image transmitter 512 transmits the video signals received from the camera 510 to the image receiver 520.

Once video signals begin transmitting, the user will view the received images on the monitor 522. At this point, the user may wish to alter the direction of the camera 510. This is accomplished by pressing the keypad 526 according to the above table. For example, if the user wishes to rotate the camera to the left, the "4" key on the keypad 526 would be pressed. If the user then wished to zoom in on a particular scene, he/she would press the "1" key on the keypad 526. In one embodiment, a single key press would provide a stepped movement of a fixed degree. In addition, if the user pressed down a key on the keypad 526, and continued to hold the key down, operation of the desired function would increase in speed. Operation in this manner allows the user to obtain fast response when substantial changes are required, while still having single step, fine tune control, as needed.

In addition to camera movement, zoom and focus control, the camera 510 provides aperture (or iris) control. This function is useful when the area that is to be viewed has dissimilar lighting conditions with respect to the rest of the image in the camera 510. By pressing the "0" and "5" keys on the keypad 526, a user may reduce or increase the light to the camera.

A further feature which has been added to the keypad 526 control is a "Smart Key" which in one embodiment has been assigned to the # key. The purpose of the Smart Key is to allow a user to undo the last change that was made to the camera. One example would be when a user overshoots in focusing the camera. The # key will back up the focus control. Another example would be if the user is trying to monitor two different locations, the camera 510 can be directed to a first location. The camera can then be rotated to view a second location. By pressing the "#" key on the keypad 526, the rotation to the second location can be undone. And, by pressing the "#" key a second time, this last change can be undone again. One skilled in the art should appreciate that the Smart Key may be used to undo any of the camera controls, whether focus, zoom, iris, pan or tilt.

As will be seen more clearly in FIGS. 6A & 6B, the camera 510 has been designed to allow continuous rotation of the view completely through 360 degrees. This is very desirous because in prior art cameras, having fixed wiring harnesses, if the desired view is just outside the maximum rotation, the camera must be rotated back around to the desired direction. And, the time required to rotate the camera, say 340 degrees, may cause the user to miss a critical portion of the viewed activity.

In addition, the camera 510 provides selectable up and down tilt of the image by utilizing a mirror to direct the desired image into a lens arrangement. In one embodiment, the mirror can be rotated with respect to the surface of the lens to tilt the image approximately 45 degrees up, and approximately 20.5 degrees down. It should be appreciated that the operational range of tilt provided is not restricted by any mechanical limitation of the camera 510. Rather, in the embodiment that resides within the street lamp, the tilt limit is restricted by the optical centerline being blocked by the front and rear of the street lamp housing.

With the above operational discussion of the present invention, a better understanding of an embodiment of the camera image transmission block 502 may be provided with reference to FIGS. 6A & 6B. These Figures will be referred to collectively as FIG. 6.

In FIG. 6, a surveillance system 600 is shown which is housed within a street lamp 602. The street lamp 602 has an upper housing 604 that is connected to a lower access panel 606, and a bulb access panel 608. Within the bulb access panel 608 is a lens (light diffuser) 610 which distributes light provided by the street lamp 602, and protects the lamp from external conditions, as well as from vandalism. The street lamp 602 is common throughout the United States, both on highways, and in residential neighborhoods.

In one embodiment, the surveillance system 600 may placed within an existing street lamp 602. However, for faster installation, a surveillance system 600 may be installed in a substitute street lamp 602 that may then be swapped for an existing street lamp. This allows for faster installation, as well as for custom configuration of the street lamp 602. For example, in one embodiment, a substitute street lamp 602 is manufactured out of a special fiberglass resin which allows antennas to be mounted internally, giving no reason to suspect that the lamp is not authentic. A preferred resin would include epoxy-based fiberglass. In addition, the fiberglass resin housing is not absorptive, even above 6 Ghz.

On the top surface 604 of the street lamp 602 is a round cutout 612. In most street lamps, the round cutout 612 is used to install a photo detector (not shown) which is used to detect poor lighting conditions (e.g., sundown, bad weather, etc.), and turn on/off the street lamp. In one embodiment of our invention, the standard photo detector has been replaced with a protective cover 620 for the camera. The protective cover 620 is virtually identical in shape, size and color to a standard photo detector, thus making the surveillance system 600 undetectable to observers on the street.

The protective cover 620 has a transparent window 622 which provides a light portal for viewing images. In addition, the window 622 seals the protective cover 620 to prevent external interference with the camera. Note: a primary problem with surveillance systems mounted outside is interference from moisture, insects, bugs, etc. Every effort has been made in the present invention to seal the camera to prevent such outside pests from interfering with surveillance. Between the protective cover 620 and the housing top surface 604, a rubber gasket 623 has been placed. The rubber gasket 623 provides easy rotation of the protective cover, while preventing rain, ice or pests from entering the lamp housing 604.

The protective cover 620 is secured to a housing for the mirror assembly 624 located inside the main housing 604. The mirror assembly housing 624 provides a secure structure for a mirror mount 626 upon which a mirror 628 is attached. The mirror 628 is the first stage of light transmission for the surveillance system 600. The mirror mount 626 is attached to the mirror housing 624 via a mirror shaft inserted through shaft holes 632 in the mirror housing 624, and holes 634 in the mirror mount 626.

Also within the mirror housing 624 is a mirror tilt motor 636. The tilt motor 636 rotates a gear 638 that engages a second gear 640 attached to the back of the mirror mount 634. When the camera image transmission block 502 receives a signal to tilt the camera up or down, the tilt motor 636 causes the gear 638 to rotate, thereby tilting the mirror 628 up or down. The mirror housing 624 is inserted into the protective cover 620 and is mounted thereto in a position to allow the mirror 628 to receive images through the transparent window 622.

Below the mirror housing 624, and secured thereto, are a couple of supports 642 (one of which is shown) on either side of a lens 644 which are used to secure the mirror housing 624 directly above the lens 644. The lens 644 is arranged below the mirror housing 624 such that light from the mirror 628 is deflected through the center of the lens 644. In one embodiment, the lens 644 provides an effective focal length of 18–180 mm, and a maximum lens aperture of f/1.8. In addition, the lens 644 may receive electronic signals (not shown) to control zoom, focus and iris.

The supports 642, and thus the lens 644 and mirror housing 624 are secured to a gear base 646 which provides a means for rotating the lens 644, mirror 628 and protective cover 620 together about a common Y axis.

Below the lens 644 is a camera adapter 648 which attaches the lens 644 to a video camera 650 and provides proper optical spacing between the lens 644 and the video camera 650. In one embodiment, the video camera 650 is a ⅓" CCD (charge-coupled device) which has a resolution of 400 TV lines and a signal to noise ratio of >48 dB. The video camera 650 receives images directed from the mirror 628, through the lens 644, and converts the images into electronic signals which are electronically image reversed to negate the effect of the mirror, and then transmitted to a remote location via a microwave transmitter 690, further discussed below.

The gear base 646 is mounted to a main hub 652 which is secured to a base plate 654 via a main bearing ring 656 sandwiched between an upper bearing ring 658 and a lower bearing ring 660. Rotation of the gear base 646 is performed by a rotation gear 662 connected to a rotation motor 664. The motor 664 and gear 662 are attached to a motor mount 666 that is secured to the base plate 654. The base plate 654 is stationary within the street lamp 602 but via the bearing ring arrangement, the base plate 654 provides a platform for rotating the mirror 628, lens 644 and video camera 650 continuously about a common Y axis.

The base plate is also attached to a hinge 668 that in turn is attached to a transmitter access panel 670. The transmitter access panel 670 provides a support structure for mounting a halogen light fixture 673, as well as providing access to the transmitter/receiver electronics within the street lamp 602, discussed further below.

The halogen light fixture 673 houses a halogen light 675. The halogen light 675 is used as a substitute for the lamp that traditionally is used within a street lamp. Additionally, a colored optical filter 667 is provided which can be inserted over the halogen lamp 675. The filter 667 can produce either a light yellow light (simulating a sodium vapor lamp) or a bluish white light (simulating a mercury vapor lamp).

Surrounding the lens 644 is a multi circuit conductor drum 672 which is also secured to the supports 642. The conductor drum 672 is a special device that allows continuous electrical contact between camera control 514 and image transmitter 512, and the video signal of the camera 650, the lens 644 focus, zoom and aperture control signals, and the tilt motor 636, as well as power and ground to the system.

The conductor drum is a hollow cylinder of machined fiberglass, to provide an insulator substrate. Bonded to the outside of the fiberglass cylinder is another cylinder of machined copper. Separate conductive rings 674 are formed on the copper drum by cutting around the diameter of the copper drum at equal intervals along its length. Connection to the separate conductive rings 674 may be accomplished in many ways, but in one embodiment, holes are drilled through the inside of the fiberglass, to allow electrical contacts to be soldered between the inside of each ring 674, and its designated signal. For example, one of the conductive rings 674 may be designated to carry the video signal. Thus, that ring is connected on the inside of the drum to the video camera 650. Since the conductive drum 672 rotates along with the camera 650, the camera 650 can rotate continuously without breaking the connection, and without twisting of contact points.

Against the conductive drum are placed a plurality of spring contacts 676 secured to the base plate 654 via a contact assembly bracket 677. Each spring contact 676 provides a continuous connection to one of the conductive rings 674 on the conductive drum 672 as the drum 672 rotates. For example, by attaching the camera zoom control signal to one of the spring contacts 676, which is stationary within the lamp 602, continuous electrical connection is made via one of the conductive rings 674 to the zoom control signal on the lens 644, even though the lens may be rotating.

Also within the lamp 602 is a decoder/driver 678, otherwise known as the camera control 514. The decoder/driver 678 is connected to a radio receiver 680, having an antenna 682. The radio receiver 680 receives control information, such as that discussed above with reference to FIG. 5, and provides the control information to the decoder/driver 678. The decoder/driver 678 interprets the DTMF signals, and provides the proper control output to either the rotation motor 664 (in the case of pan/rotate commands), the video transmitter 690, the lens 644 (for focus, zoom and iris commands) or the tilt motor 636 (for mirror tilt). Except for the transmission and rotation commands (camera and antenna), all of the other control commands are transmitted via the decoder/driver 678 via the contact springs 676, through the conductive drum 672, to their respective destinations.

Also shown within the lamp 602 is a power supply 684. The power supply is connected to an AC source (not shown) and provides power to all of the electronics in the surveillance system 600, as well as to the light 673.

Two other devices are also shown in FIG. 6. The first is an environmental control block 686. This block is used to sense temperature and humidity within the lamp 602, and to selectively turn on a fan 687 to cool the electronics, or to remove moisture from inside the lamp 602. The second block is a phone line transceiver 688. The phone line transceiver 688 is not necessary for the operation of the surveillance system 600, but may be included as an additional feature. Once connected to a standard phone line, it would allow control of the surveillance system 600 through a telephone from a location beyond the reception area of the radio receiver 680.

Finally, the surveillance system 600 includes a microwave transmitter 690 having a directional antenna 692. The microwave transmitter 690 is connected to the video camera 650, and if turned on (by the command **8) transmits video images to a corresponding receiver which is located some distance from the lamp 602. The directional antenna 692 is rotated using the commands described above with reference to FIG. 5. Further information regarding the directional antenna 692, and the means for rotating the antenna 692 is provided below with reference to FIGS. 7 and 8.

One example of the operation of the surveillance system 600 is as follows. A user in a remote location turns the transmitter 690 on by pressing the **8 key on his/her radio transmitter. The command signal is received by the radio receiver 680 and relayed to the decoder/driver 678. The decoder/driver 678 provides a signal to the microwave transmitter 690 to begin transmitting video images. If the user wishes to pan left, then down and zoom in, the user would press 4, 8, 1, or any combination on the radio transmitter to achieve the desired image. The commands would be received by the radio receiver 680 and would be relayed to the decoder/driver 678. The decoder/driver would send the pan left control to the rotate motor 664, the tilt down signal to the tilt motor 636, and the zoom in command to the lens 644. During the command sequence, continuous video would be provided by the video camera 650 to the microwave transmitter 690 via the video signal ring on the conductive drum.

Moreover, if the image transmitted by the transmitter 690 is not particularly clear at the reception site, the user can rotate the directional antenna 692 by pressing either the 1, or 3 commands. As the antenna 692 rotates right or left, the signal strength of the transmission will increase or decrease, accordingly.

Figure 7:
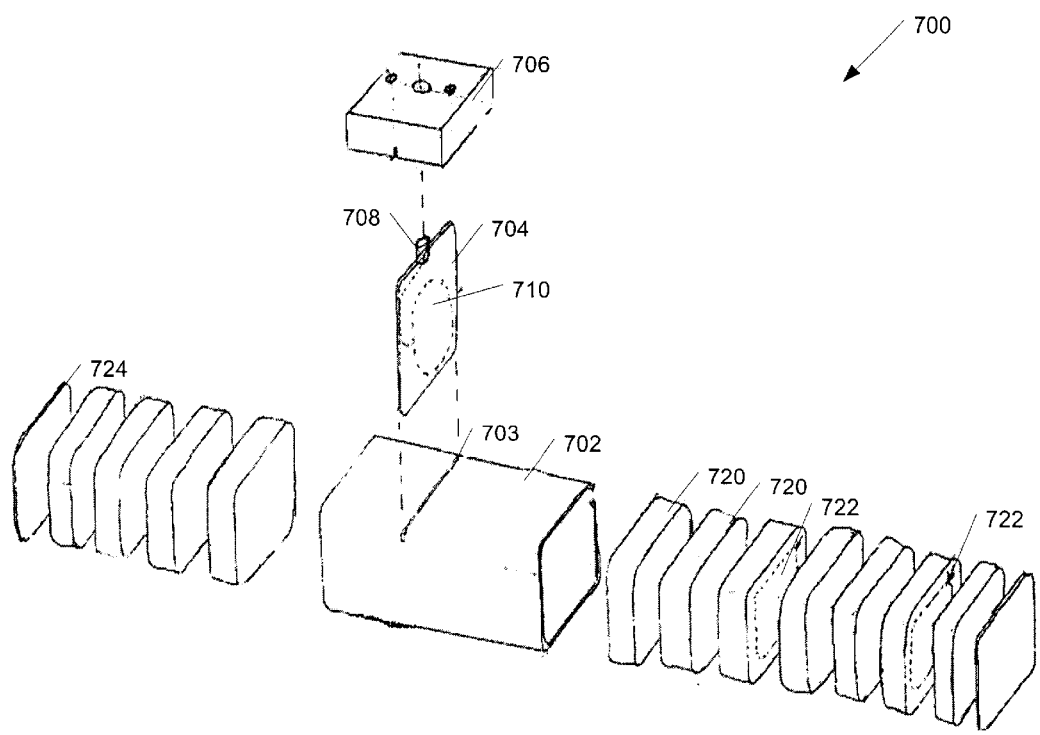
FIG. 7 provides an exploded view of a directional antenna that is incorporated within the street lamp housing shown in FIG. 6.

Referring now to FIG. 7, a block diagram is shown particularly illustrating a directional antenna 700 according to the present invention. In one embodiment, a loop yagi antenna was chosen, because it provides optimum gain, within a relatively small form factor. The antenna 700 includes a housing 702 for securing a number of spacers 720 relative to a transmission element 710. The transmission element 710 is essentially a copper wire etched on the surface of a fiberglass printed circuit board 704. Attached to the PCB 704 is a connector 708 that is coupled to the microwave transmitter 690. The PCB 704 is fixed to a rotation block 706 (described below with reference to FIG. 8). In one embodiment, the PCB 704 is inserted into a slot 703 in the housing 702. The housing 702 is then filled with Styrofoam spacers 720. On every 3 spacers 720, a wire loop element 722 is bonded thereto. On the back end of the antenna 700 is a metal reflector 724. When all of the spacers 720, and attached elements 722 are inserted into the housing 702, a directional antenna 700 is provided. In one embodiment, the antenna 700 provides approximately 6 db of gain, and has an operational frequency of approximately 1800 MHz.

Figure 8:
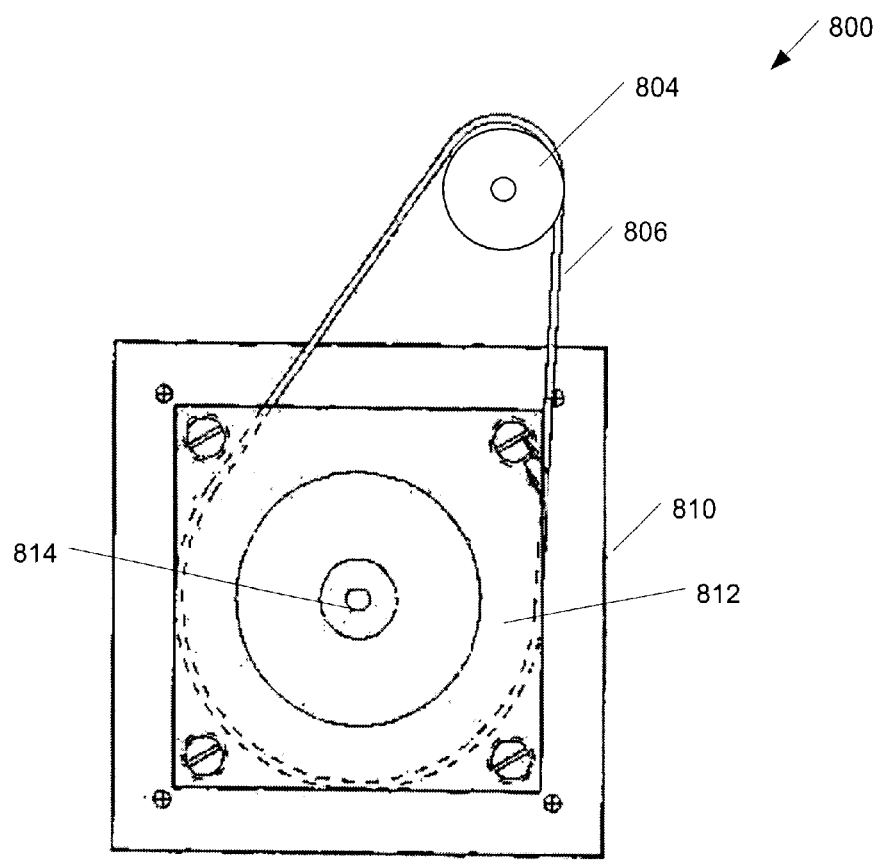
FIG. 8 provides a top down view of a mounting apparatus that provides 360 degree rotation of the directional antenna of FIG. 7.

Referring now to FIG. 8, a block diagram is shown of a mechanism 800 for rotating the antenna 700 360 degrees without restriction. The mechanism 800 includes a rotating motor 804 coupled to a belt 806. The belt 806 is also coupled to a disk 812 rotatably mounted on a rigid base 810. As the motor 804 rotates, the belt 806 and the disk 812 rotate relative to the base 810. Attached to the disk 812 is the rotatable block 706, and the antenna housing 702. An electrical coupling is made between the antenna 700 and the transmitter 690 via the connector 708, secured within a rotating coupling 814 within the disk 812.

Thus, when a user wishes to improve his/her video transmission, s/he commands the transmitter 524 via the keypad 526 to rotate the antenna 700 right or left. The command is received by the radio receiver 516, and forwarded to the camera control 514. The control signals the motor 804 to rotate right or left, causing the belt 806 to rotate, thereby causing the antenna 700 to rotate. By utilizing the directional antenna 700 within the street lamp housing 600, surveillance may be achieved from as far away as 18–20 miles.

Although the present invention has been described in considerable detail with reference to certain preferred versions thereof, other versions are possible. For example, an alternative embodiment would allow the surveillance system to be permanently installed in a particular location by direct wiring video output and camera control signals to a remote location. Such direct wiring could be made via coax, fiber optic, Ethernet, or twisted pair cable. In such an arrangement, a matrix of surveillance systems could be viewed and controlled from a central location. Furthermore, it is possible to utilize existing phone lines to either transmit control signals, or receive video. By adding at least one phone line to the surveillance system, control of the camera could be made from any location using a touch-tone telephone. In addition, video images could be transmitted to any location having telephone service. At present, analog telephone service only allows for low bandwidth video transmission, but it is envisioned to utilize the present invention in combination with video compression technology over low bandwidth analog lines, or in the alternative to utilize high bandwidth digital telephone lines such as ISDN. Furthermore, where images are to be recorded for extended periods, it may be advisable to utilize slow scan TV rather than continuous image feed, especially where the image being recorded seldom changes. This would allow video images over existing analog lines to be transmitted to even greater distances.

Also, a CCD video camera has been used because of its small size, but other improvements in the camera may be possible. Furthermore, the surveillance system described has been placed within a street lamp because of the ready access to large installed base. However, because of the small size of the surveillance system, the mirror/lens/camera arrangement, surrounded by the conductive drum, could be hidden in a number of different covert containers. Furthermore the mirror/lens/camera arrangement may be physically separated from the rest of the electronics, as long as sufficient signal connections were maintained, to allow the camera to be placed in an even smaller container. In addition, a circuit could be added to the lamp which would allow the user to switch the lamp on/off, or could place the lamp in a stutter mode to simulate a faulty street lamp. Such a condition might prevent the lamp from being shot out prior to the occurrence of criminal activity.

On/Off control could also be added to other features of the camera, such as the image transmitter, the iris control, or even the pan and tilt. For example, if the user wished to view a particular scene only, he/she could temporarily lock out pan and zoom to prevent the camera from moving, while still allowing focus and zoom control. If the officer were recording a particularly important incident, an unintentional pan command could be avoided. Password protection could also be added to a command sequence to prevent any change from affecting the camera unless an appropriate command sequence were entered.

Command control could also be provided which would allow the user to vary the transmission power of the video signal. This would be important in situations where more than one transmitter was being used within a particular reception area. In this instance, key commands could be used to lower, or raise, the transmission power of the image transmitter.

Additionally, a photo detector may be added to the surveillance system to replace the one which was removed from the top surface of the street lamp. In an alternative embodiment, the surveillance system may extend through a street lamp surface other than the top. For example, the lens arrangement may be mounted on the bottom of the lamp, either within the globe, or behind it.

Furthermore, alternative antennas may be used to further improve the range of transmission for the video images.

Although the present invention and its features and advantages have been described in detail, those skilled in the art should appreciate that they can readily use the disclosed conception and specific embodiment(s) as a basis for designing or modifying other structures for carrying out the same purposes of the present invention, and that various changes, substitutions and alterations can be made without departing from the spirit and scope of the invention as defined by the appended claims.

We claim:

1. A remote controlled directional antenna coupled to a surveillance camera system mounted within a street lamp, comprising:

direction command reception logic, for receiving antenna direction commands from a remote location;

a motor, coupled to said direction command reception logic, for turning in response to said antenna direction commands; and a directional antenna, coupled to said motor, changing direction in response to the turning of said motor;

wherein said commands transmitted from the remote location cause said directional antenna to be directed to the remote location for optimum reception of signals generated by the surveillance camera system.

2. The remote controlled directional antenna, as recited in claim 1, wherein said direction command reception logic comprises a radio receiver.

3. The remote controlled directional antenna, as recited in claim 2, wherein said direction command reception logic further comprises a command decoder, coupled to said radio receiver, for decoding radio signals into said antenna direction commands.

4. The remote controlled directional antenna, as recited in claim 1, wherein said direction command reception logic comprises a touch tone decoder, coupled to a telephone line, for decoding touch tone signals into said antenna direction commands.

5. The remote controlled directional antenna, as recited in claim 1, wherein said directional antenna is a loop yagi antenna.

6. The remote controlled directional antenna, as recited in claim 1, wherein said motor turns either clockwise (to the right), or counter clockwise (to the left) in response to said antenna direction commands.

7. The remote controlled directional antenna, as recited in claim 1, wherein said motor further comprises:

a rotatable disk, coupled to said directional antenna;

a belt, coupled to said rotatable disk; and a motor, coupled to said belt;

wherein when said motor turns, said directional antenna turns.

* * * * *